United States Patent
Roberts et al.

(10) Patent No.: US 10,239,506 B2
(45) Date of Patent: Mar. 26, 2019

(54) SYSTEM AND METHOD FOR SENSING PEDAL ROD TO PISTON ROD GAP IN A BRAKE BOOST ASSIST SYSTEM OF A MASTER CYLINDER

(71) Applicant: Autoliv ASP, Inc., Ogden, UT (US)

(72) Inventors: Curt M. Roberts, Southfield, MI (US); Suat Ali Ozsoylu, Rochester Hills, MI (US)

(73) Assignees: VEONEER NISSIN BRAKE SYSTEMS JAPAN CO., LTD., Ueda-shi, Nagano-Ken (JP); VEONEER US, INC., Southfield, MI (US)

( * ) Notice: Subject to any disclaimer, the term of this patent is extended or adjusted under 35 U.S.C. 154(b) by 0 days.

(21) Appl. No.: 15/639,385

(22) Filed: Jun. 30, 2017

(65) Prior Publication Data
US 2019/0001940 A1   Jan. 3, 2019

(51) Int. Cl.
*B60T 8/40*   (2006.01)
*B60T 8/171*   (2006.01)
(Continued)

(52) U.S. Cl.
CPC ............ *B60T 8/171* (2013.01); *B60T 7/042* (2013.01); *B60T 13/745* (2013.01); *B60T 2220/04* (2013.01); *B60T 2270/82* (2013.01)

(58) Field of Classification Search
CPC .......... B60T 13/74; B60T 13/745; B60T 7/04; B60T 7/042; B60T 7/065; B60T 8/4077; B60G 13/008
(Continued)

(56) References Cited

U.S. PATENT DOCUMENTS

| 5,016,520 A | 5/1991 | Gautier |
| 2004/0012253 A1* | 1/2004 | Stephane ............. B60G 13/003 303/114.3 |

(Continued)

FOREIGN PATENT DOCUMENTS

DE   19936433 A1   2/2001

OTHER PUBLICATIONS

International Search Report and Written Opinion of the ISA for related application PCT/US2018/039282, ISA/US, dated Aug. 28, 2018.

*Primary Examiner* — Christopher P Schwartz
(74) *Attorney, Agent, or Firm* — Stephen T. Olson; Harness, Dickey & Pierce, P.L.C.

(57) ABSTRACT

A brake boost assist system for use with a master cylinder of a motor vehicle braking system, includes an inductive sensing system. The inductive sensing system has sensing devices carried on an input member and an output member, where the input and output members are coupled to respective ones of an input rod and an output rod of the brake boost assist system. Movement of the input and output members relative to one another, and relative to a fixed element of the inductive sensing system positioned within the brake boost assist system, enables an accurate estimation of the distance of a pedal gap which separates faces of the input and output rods. The accurate estimation of the pedal gap distance enables a more accurate determination to be made of the braking force required for any given pedal stroke input by an operator of the vehicle during a braking action.

20 Claims, 7 Drawing Sheets

(51) Int. Cl.
B60T 7/04 (2006.01)
B60T 13/74 (2006.01)

(58) Field of Classification Search
USPC ............... 303/114.1, 114.3; 60/547.1–547.3, 60/548–590
See application file for complete search history.

(56) References Cited

U.S. PATENT DOCUMENTS

2015/0028664 A1* 1/2015 Choi ..................... B60T 8/4077
303/3
2017/0259797 A1* 9/2017 Serrano ................... B60T 7/042

* cited by examiner

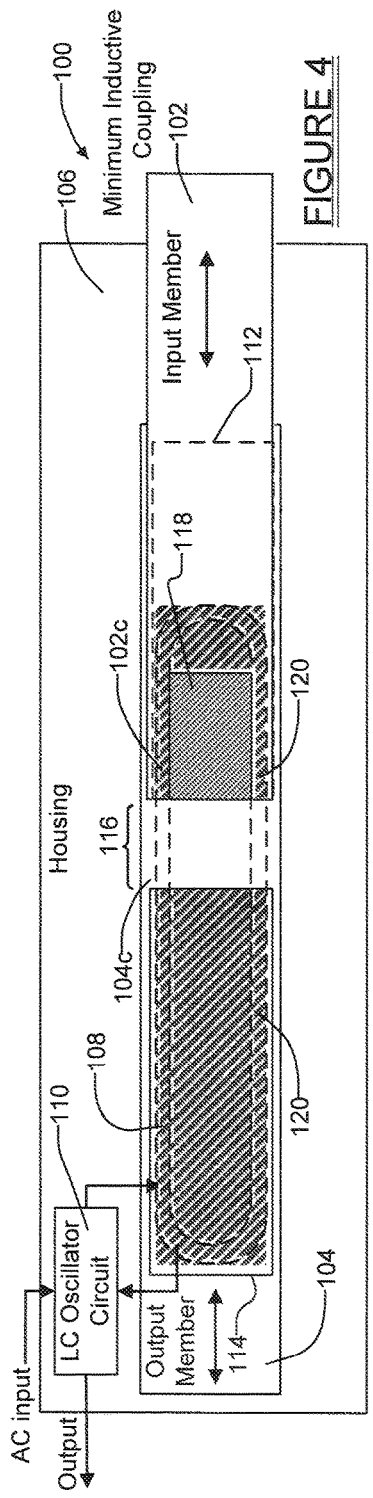
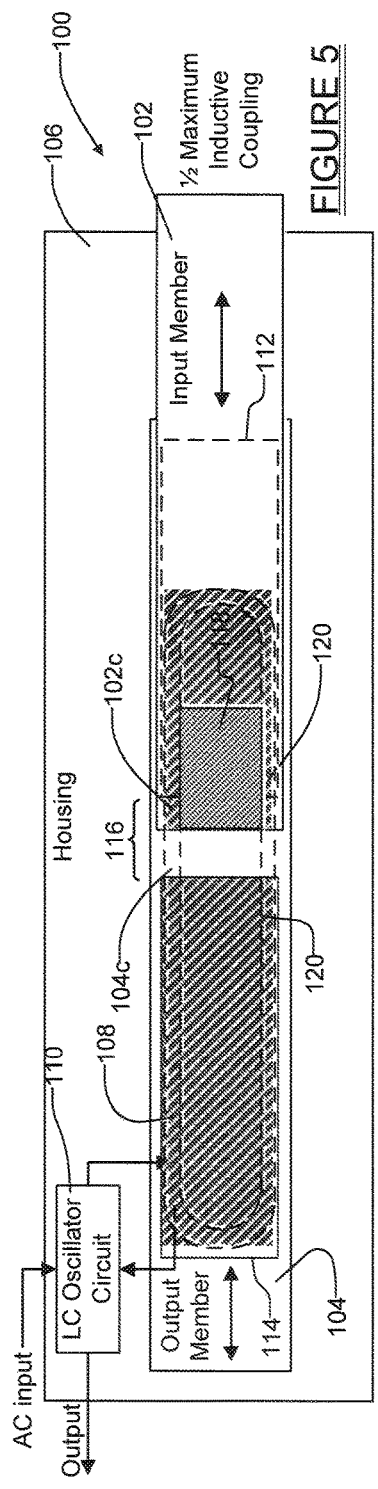
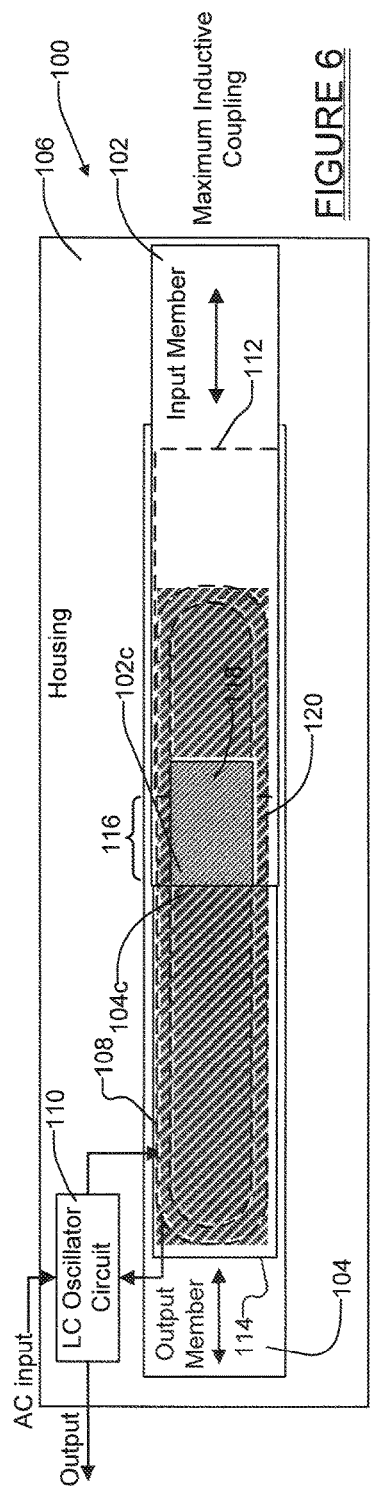

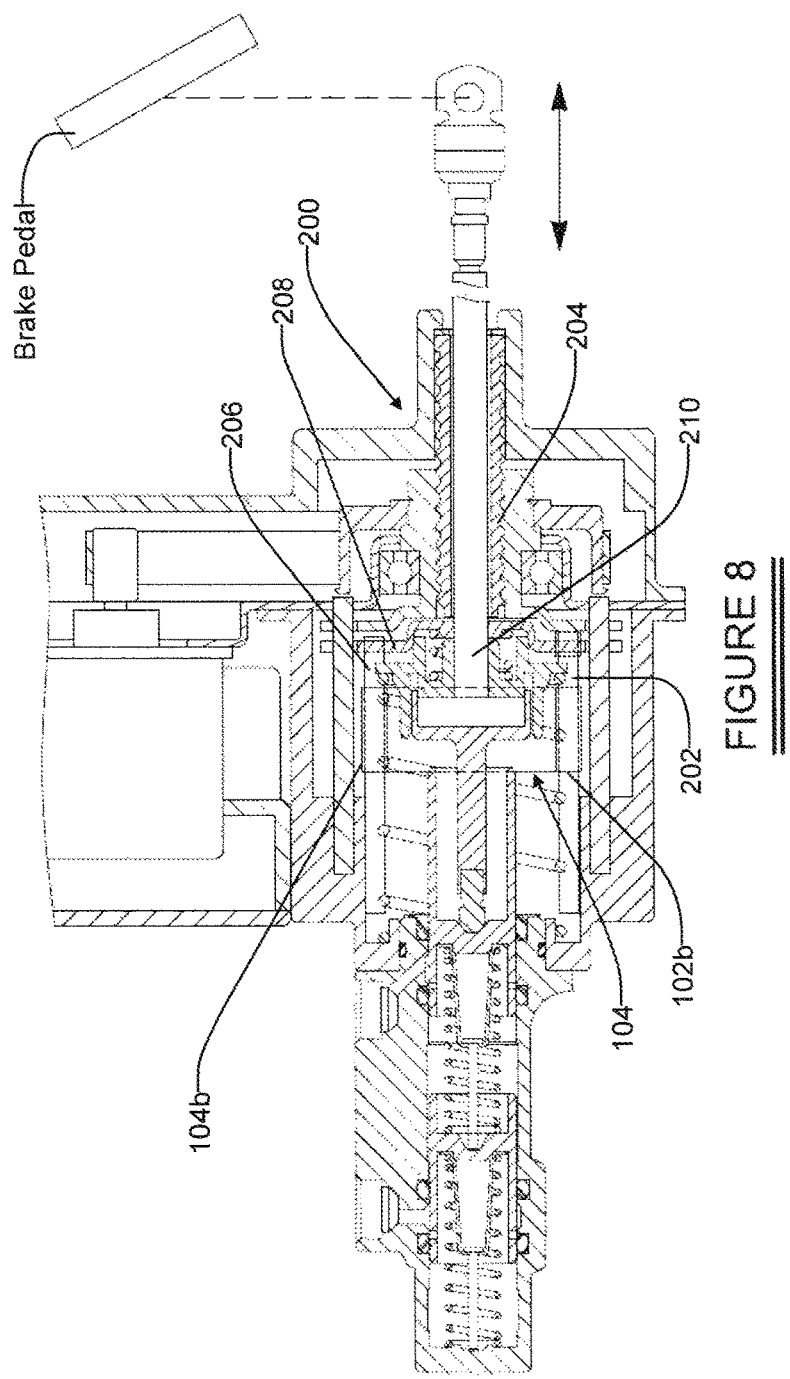

US 10,239,506 B2

SYSTEM AND METHOD FOR SENSING PEDAL ROD TO PISTON ROD GAP IN A BRAKE BOOST ASSIST SYSTEM OF A MASTER CYLINDER

FIELD

The present disclosure relates to brake systems for motor vehicles such as cars and trucks, and more particularly to a system and method for more accurately sensing a gap between a pedal rod and a piston rod in a master cylinder of a brake system.

BACKGROUND

The statements in this section merely provide background information related to the present disclosure and may not constitute prior art.

Present day braking systems used with motor vehicles typically make use of a pedal travel sensor which detects a length of travel of the brake pedal when the operator presses on the brake pedal during a braking action. This detected length of movement of the brake pedal is used to determine a degree of braking action (i.e., braking force) that needs to be applied to the brake calipers of the vehicle.

FIGS. 1a-1c illustrate a conventional master cylinder in which an input rod 1 is moved axially by movement of a brake pedal 2. The input rod 1 acts on a reaction disc 3, which in turn acts on an output rod 4, when the operator presses on the brake pedal 2. The output rod 4 engages a first piston 5 within the master cylinder, which typically controls the braking action of a primary braking circuit of the vehicle (e.g., the passenger side front brake and driver side rear brake), and the first piston engages a second piston 6, which typically controls a secondary braking circuit of the vehicle (e.g., the driver side front brake and the passenger side rear brake). As seen best in FIG. 1a, a gap 7 typically exists between the face of the reaction disc and the face of the output rod. The gap may also be defined by the distance of arrow 8 in FIG. 1c. For this example, the reaction disc 3 may be considered as a part of the input rod 1, and thus the face of the reaction disc may be considered to be the face of the input rod.

This gap 7 affects the accuracy of the braking force determination when the determination is made simply by looking at the pedal 2 travel distance during a braking action. Determining the gap 7 would enable an even more accurate pedal travel determination to be made, and thus an even more accurate determination of the braking force required for a given braking action. Improved accuracy of the gap sensing may also result in an improved pedal "feel" for the operator applying the brakes. However, determining the gap 7 is not straight forward, as the gap may vary within different brake boost assist systems, and further may vary over time due to wear of various internal parts of the brake boost assist system. Still further, the distance of the gap 7 needs to be detected accurately in real time to maximize the accuracy of the brake pedal 2 travel length determination. And the mechanism for sensing the gap 7 needs to be able to operate, and to be integrated into the master cylinder, without requiring significant modification to the design and construction of the master cylinder, and without significantly increasing its expense, dimensions or weight.

SUMMARY

The present disclosure relates to a brake boost assist system for use with a master cylinder of a motor vehicle braking system. The brake boost assist system may comprise an inductive sensing system. The inductive sensing system may include a fixed sensing component fixedly disposed within the brake boost assist system; an axially movable input member operably associated with an input rod, the input rod in turn associated with a brake pedal of the vehicle, and wherein the input member is movable in response to movement of the input rod and further is movable in proximity to the fixed sensing component. The axially movable input member may include a first sensing device. An output member may be included which is generally axially aligned with the input member and adapted to be moved axially by the input member. The output member is operably associated with an output rod of the brake boost assist system and includes a second sensing device. The first and second sensing devices are arranged to simulate an axial pedal gap separating faces of the input and output rods. The inductive sensing system is responsive to movement of at least one of the input and output members relative to the other to provide an output signal indicative of a distance representing the axial pedal gap during brake pedal travel.

In another aspect the present disclosure relates to a brake boost assist system for use with a master cylinder of a motor vehicle braking system. The brake boost assist system may comprise an inductive sensing system for detecting a pedal gap between faces of an input rod and an output rod of the brake boost assist system. The inductive sensing system may include an AC input signal, a first fixedly mounted coil disposed within the brake boost assist system, and a second fixedly mounted coil disposed within the brake boost assist system and circumscribed by the first fixedly mounted coil, one of the first and second fixedly mounted coils receiving the input signal. An axially movable input member may be included which is operably associated with the input rod, which is in turn associated with a brake pedal of the vehicle. The input member is movable in response to movement of the input rod, and further movable in proximity to the first and second fixedly mounted coils. The axially movable input member may include an input member coil. An output member is included which is generally axially aligned with the input member and adapted to be moved axially by the input member. The output member is operably associated with the output rod of the brake boost assist system and includes an input member coil. The input and output member coils further are arranged to at least partially overlap one another during movement of the input and output rods. A degree of overlap of the input and output member coils during movement of at least one of the input and output rods influences an inductive coupling between the first fixed coil and the second fixed coil. The one of the first and second fixedly mounted coils that is not receiving the input signal provides an output signal representing the axial pedal gap during brake pedal travel.

In still another aspect the present disclosure relates to a method for sensing a pedal gap within a brake boost assist system associated with a master cylinder of a motor vehicle braking system. The method may comprise arranging a fixedly mounted sensing component within the brake boost assist system, and coupling an axially movable input member to an input rod of the brake boost assist system. The input rod may in turn be associated with a brake pedal of the vehicle, and wherein the input member is movable in response to movement of the input rod and further is movable in proximity to the fixedly mounted sensing component, and wherein the axially movable input member may include a first sensing device. The method may further include coupling an output member to an output rod of the brake boost assist system, the output member further being generally axially aligned with the input member and moveable axially by the input member, and carrying a second sensing device. The method may further include forming an inductive circuit with the first and second sensing devices and the fixedly mounted sensing component. The method may further involve generating a signal with the inductive circuit indicative of a distance representing an axial pedal gap separating faces of the input member and the output member during brake pedal travel, in response to movement of at least one of the first sensing device, the second sensing device and the fixedly mounted sensing component.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 shows another inductive sensing system in accordance with the present teachings for sensing the pedal gap, the induction sensing system using an LC oscillator circuit and a plurality of metallic elements mounted on an output member with a gap between them, and a rectangular metallic member fixedly mounted on the input rod of the brake boost assist system;

FIG. 5 shows the inductive sensing system of FIG. 4 but with the input member partially extended toward the output member, which causes a change in frequency of the LC oscillator circuit of the system, and thus indicates a change in the pedal gap distance;

FIG. 6 shows the inductive sensing system of FIG. 4 but with the input member fully extended over the output member, which results in a maximum change in frequency of the signal generated by the LC oscillator circuit;

FIG. 8 shows the various components of FIG. 7 integrated into the brake boost assist system.

DETAILED DESCRIPTION

Figure 1A:
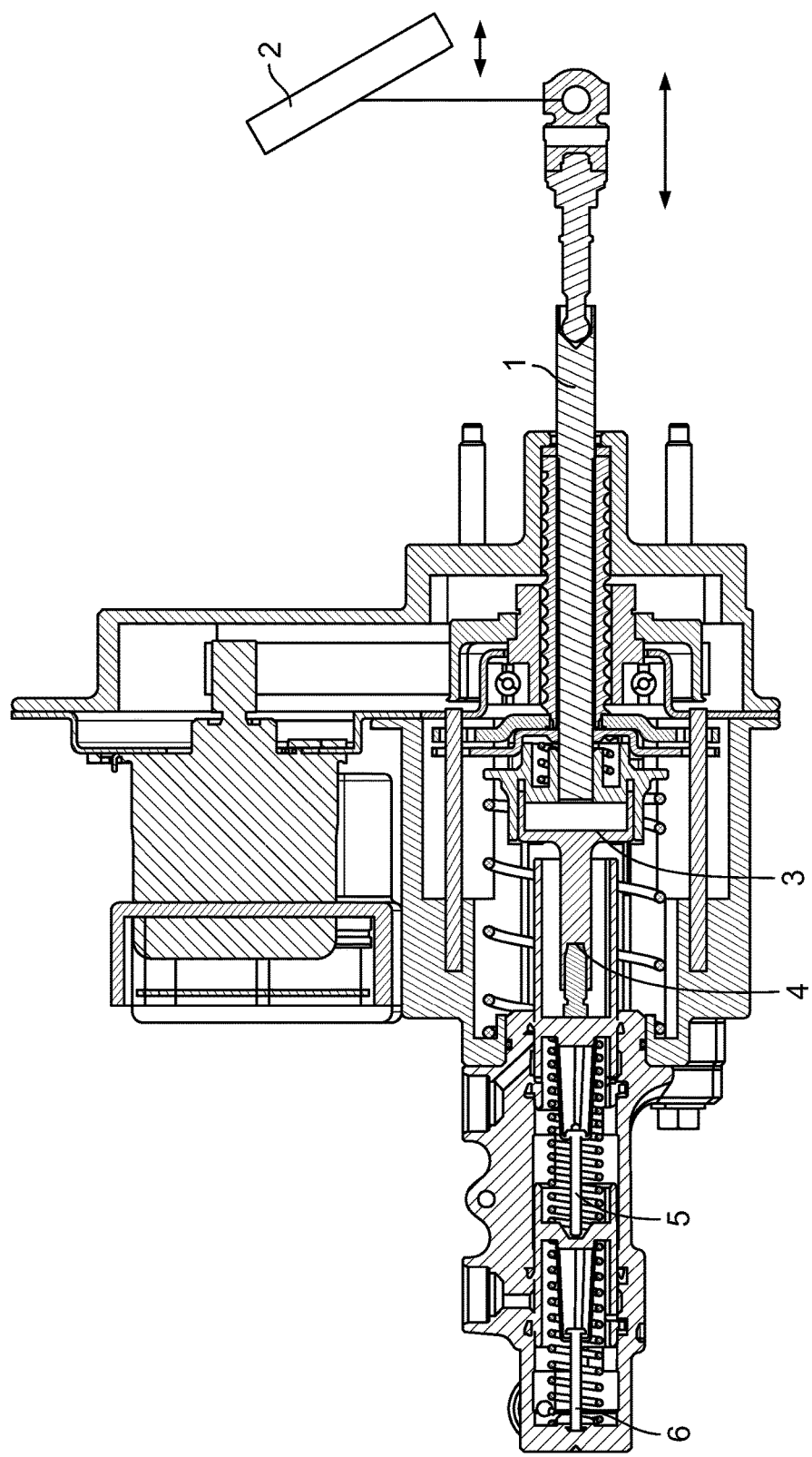
FIG. 1a is a simplified side view of a prior art master cylinder and brake boost assist system illustrating various internal components, and particularly the input rod, the output rod and the reaction disc housed within the brake boost assist system.

The following description is merely exemplary in nature and is not intended to limit the present disclosure, application, or uses. It should be understood that throughout the drawings, corresponding reference numerals indicate like or corresponding parts and features.

Figure 1B:
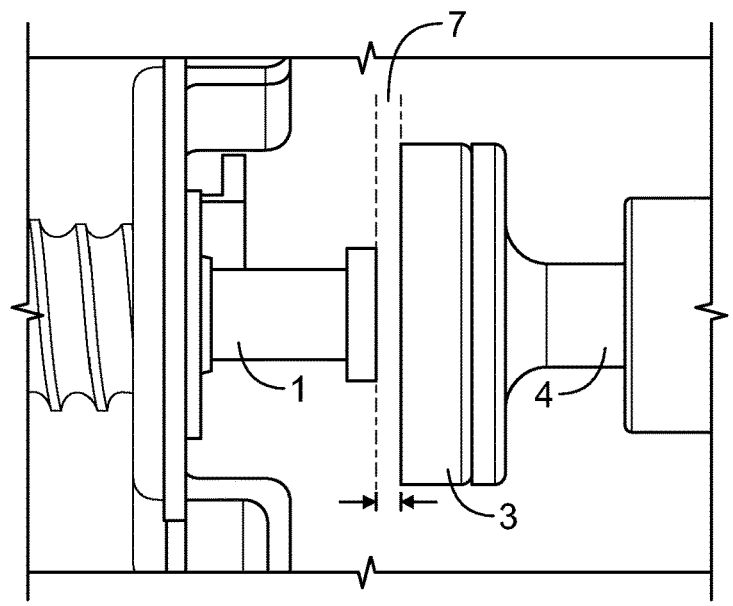
FIG. 1b is a highly enlarged side view of the area within the prior art brake boost assist system of FIG. 1a where the input rod, the output rod and the reaction disc are located, and better illustrating the gap that is present between a face of the reaction disc and a face of the output rod.
Figure 1C:
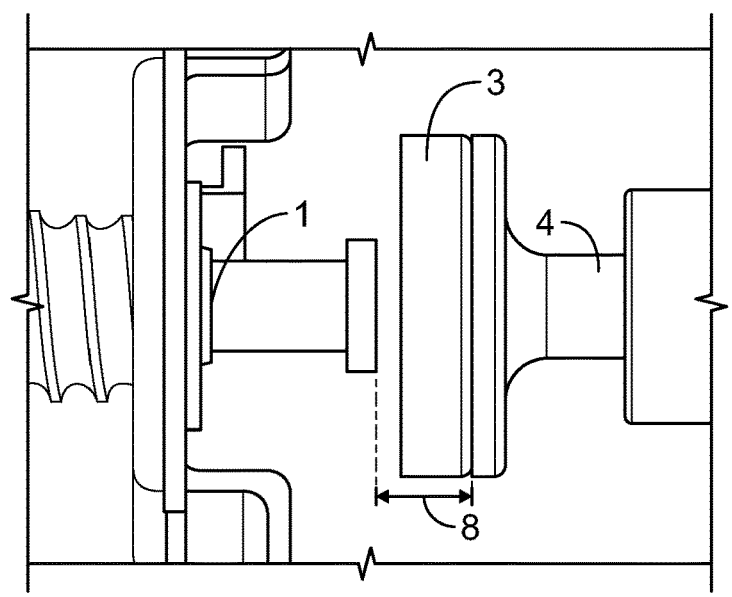
FIG. 1c is a highly enlarged side view of the area within the prior art brake boost assist system of FIG. 1a illustrating a different way to define the pedal gap.
Figure 2:
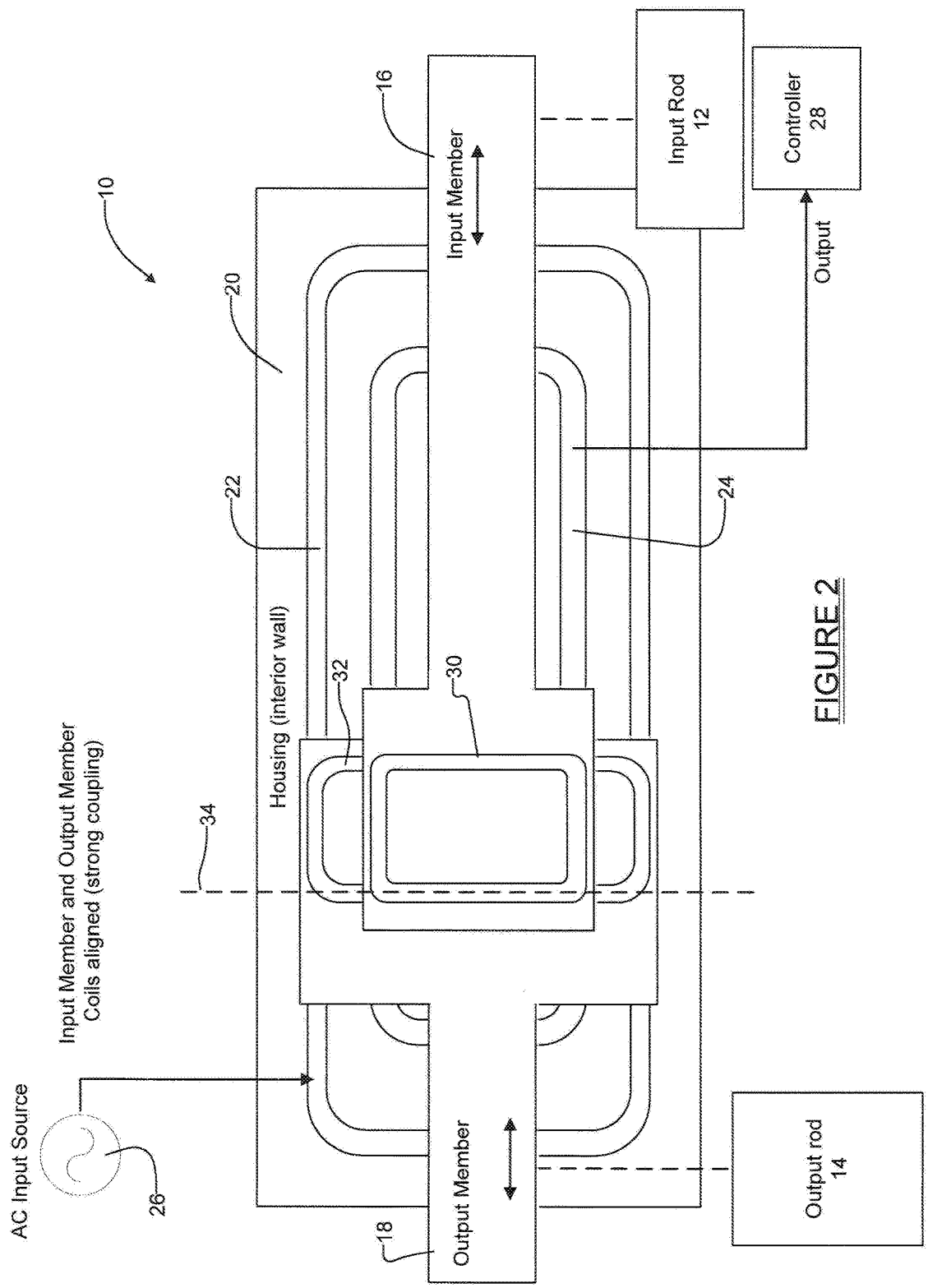
FIG. 2 is a simplified block diagram of an inductive sensing system in accordance with the present teachings that may be incorporated into the brake boost assist system shown in FIG. 1a to sense the pedal gap in real time, the inductive sensing system having first and second coils which are used to form a variable coupling transformer that provides an electrical signal indicative of the degree of pedal gap present, the coils shown aligned to indicate that no pedal gap is present.

Referring to FIG. 2, one embodiment of a system 10 is shown for inductively sensing a pedal gap between an input rod 12 and an output rod 14 of the boost assist system of the master cylinder assembly shown in FIGS. 1a-1c. It will be understood that the master cylinder assembly of FIGS. 1a-1c is exemplary insofar as the present teachings are concerned. In this regard, the present teachings may be adapted to other master cylinder assemblies within the scope of the present teachings. In this particular implementation, the input rod 12 is coupled to an input member 16 that moves with, and parallel to, the input rod 12. The output rod 14 is likewise coupled to an output member 18 that moves with, and parallel to, the output rod 14. In the embodiment illustrated, the input member is an axially movable input member 16. The coupling may be accomplished with any suitable brackets or other like elements that enable the input and output members 16 and 18 to be fixedly supported relative to the input rod 12 and output rod 14, but spaced slightly radially apart from an axial centerline of the input and output rods, and moved freely axially along with movement of the input and output rods 12 and 14.

A housing 20 of the boost assist system 10 has an inner surface on which a first coil or first fixedly mounted coil 22 and a second coil or second fixedly mounted coil 24 are both fixedly secured. As illustrated, the second coil 24 may be disposed within an area circumscribed by the first coil 22. The first and second fixedly mounted coils 22 and 24 together form a fixed sensing component fixedly disposed within the brake boost assist system 10. One of the first and second coils 22 and 24 may receive an AC input signal. For example, the first coil 22 may be coupled to an AC input source 26 and may receive an AC input signal. The second fixed coil 24 provides its output to a controller 28. As will be understood by those skilled in the art, the output may be an analog AC output which is first processed by an A/D converter prior to transmission to the controller 28. The output represents the signal coupled from the first coil 22 to the second coil 24, which is directly proportional to a distance of the pedal gap described in FIGS. 1a-1c, as will be described in greater detail in the following paragraphs. The controller 28, which may be an electronic control unit (ECU) of a vehicle, uses the output signal from the second coil 24 to take the pedal gap distance into account. Using this information, along with information from the pedal stroke sensor, enables the controller 28 to even more accurately estimate the braking force that needs to be generated in response to the brake pedal movement.

One central feature of the system 10 of the present teachings is its ability to inductively sense the pedal gap distance at any given time, and help to provide the output signal to the second fixed coil 24 which takes this pedal gap distance into account. This is accomplished by providing an input member coil 30 which is secured to, or otherwise mounted on or carried by, the input member 16, and an output member coil 32 which is secured to or otherwise mounted on or carried by the output member 18. It will be understood that the input member coil 30 and output member coil 32 may include one or more distinct coil portions. The input member 16 and output member 18 may be further arranged so that the input member coil 30 overlaps the output member coil 32. In FIG. 2, the input member 16 is shown on top of the output member 18. It will be understood, however, that this configuration may be reversed. One important consideration is that the input member coil 30 and the output member coil 32 are positioned to overlap one another, and further such that the input member coil 30 and output member coil move axially along a common longitudinal axis.

The output member 18 and the input member 16 are further coupled to the output rod 14 and the input rod 12 during construction of the boost assist system 10. In this way, when the pedal gap distance is essentially zero, the portions of the input member coil 30 and the output member coil 32 will be perfectly, or essentially perfectly, aligned over one another, as indicated by dashed line 34 in FIG. 2.

Figure 3:
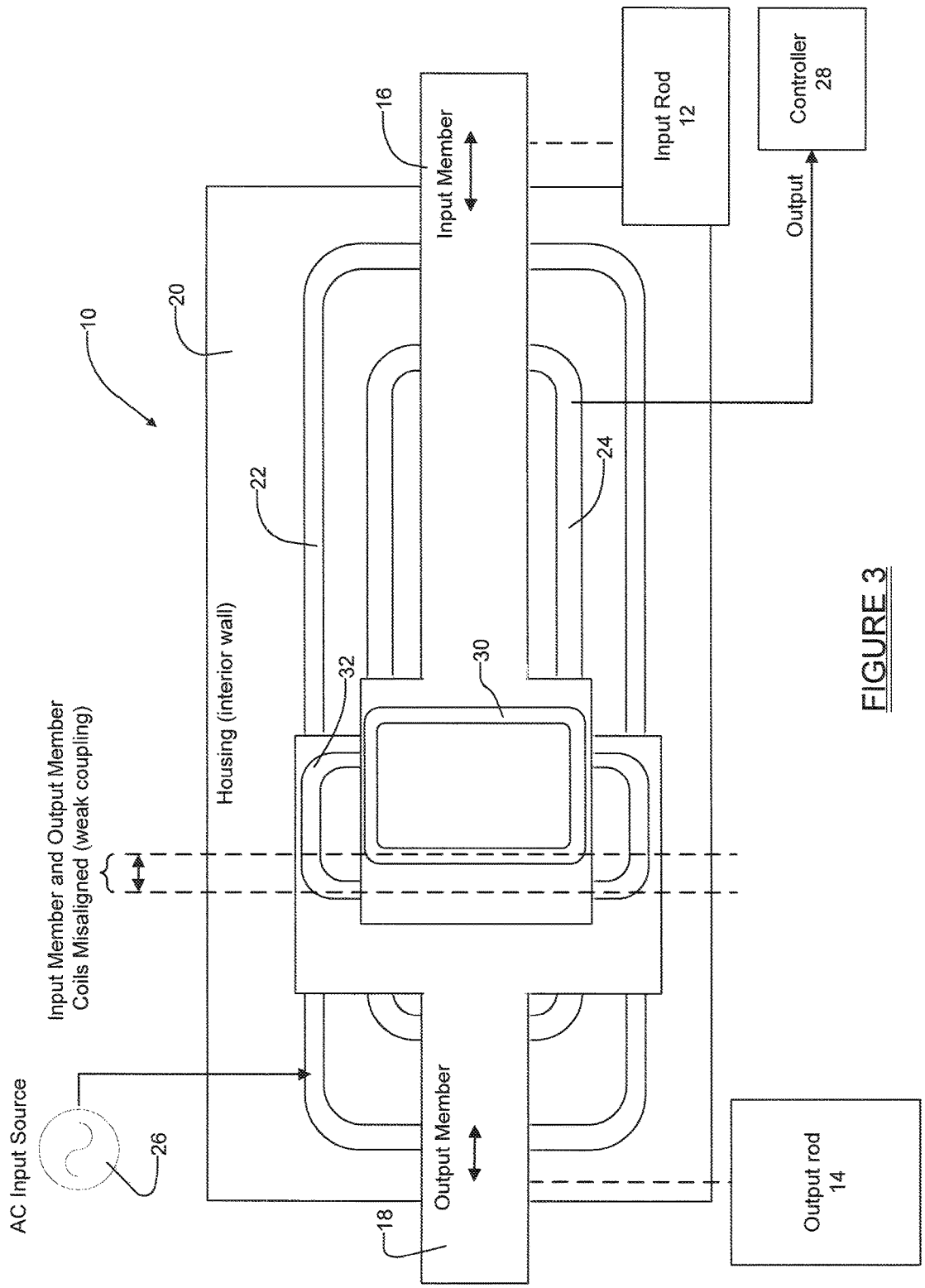
FIG. 3 is shows the inductive sensing system of FIG. 2 but instead showing the first and second coils misaligned to indicate that a pedal gap exists.

In operation, when a pedal gap exists, such as shown in FIG. 3, the inductive coupling (i.e., magnetic flux coupling) between the first coil 22 and the second coil 24 will be less than a predetermined maximum value. This is because of the misalignment of the input member coil 30 and the output member coil 32. This misalignment reduces the magnetic flux that can be coupled by the input member coil 30 and the output member coil 32, acting together, from the first fixed coil 22 to the second fixed coil 24. The degree or distance of longitudinal spacing between the input member coil 30 and the output member coil 32 (i.e., axial misalignment) will directly affect the coupling, and the signal coupled into the second fixed coil 24. The degree or distance of longitudinal spacing may directly affect the coupling in a linear manner. Therefore, when the input member coil 30 and output member coil 32 are misaligned by a maximum axial amount, as indicated in FIG. 3, the signal coupled into the second fixed coil 24 will be a minimum, but when the input member coil 30 and the output member coil 32 are overlapping as shown in FIG. 2, the maximum magnetic flux will be coupled between the fixed coils 22 and 24, and the signal will be a maximum. In this manner, the input and output member coils 30 and 32 simulate an axial pedal gap separating faces of the input and output rods 12 and 14. The signal generated by the second coil 24 may vary linearly between the minimum and maximum valves directly in accordance with the magnitude of the pedal gap distance.

One important advantage of the system 10 is that the sensing of the pedal gap distance is not affected by the exact axial location of the pedal gap relative to the housing 20. In other words, if the pedal gap was present slightly to the left or right in the drawing of FIG. 3, this orientation would have no effect on the accuracy of the system 10 in generating an electrical signal representing the pedal gap distance. As long as the input member coil 30 and output member coil 32 are positioned over both of the first and second coils 22 and 24 during operation of the system 10, the system will be able to reliably detect the pedal gap distance.

Referring now to FIG. 4, a system 100 in accordance with another embodiment of the present disclosure is shown. The system 100 is similarly operative to sense the pedal gap distance using an inductive sensing methodology. To the extent not otherwise described, it will be understood that features between the two systems 10 and 100 are common. In the embodiment illustrated, the system 100 more specifically uses an LC oscillator-like construction, and senses a change in frequency of an AC signal which is applied to a coil associated with one of the input or output members, which can be correlated proportional to the pedal gap distance.

In FIG. 4, the system 100 can be seen to include an input member 102 which is operatively coupled to the input rod of the master cylinder of FIG. 1 (not shown in FIG. 4). The system 100 also includes an output member 104 which is operatively coupled to the output rod (also not shown in FIG. 4). The input and output members 102 and 104 move linearly in accordance with axial movement of the input rod and output rod, just as described for the input and output members 16 and 18, respectively, of the system 10 in FIGS. 2 and 3. In the system 100 of FIG. 4, the input member 102 lies over the output member 104, but the opposite orientation would work just as well (i.e., the output member 104 lies over the input member 102). Both of the input and output members 102 and 104 are positioned over a coil 108 that is fixedly mounted on an inner wall surface of a housing 106 of the master cylinder. The coil 108 receives an AC signal from an LC oscillator circuit 110. In this example two additional fixed metallic elements 112 and 114 are fixedly secured to the output member, and spaced apart to define a gap or region 116 therebetween. The fixed metallic elements 112 and 114 together may be viewed as a "sensing subsystem" or as a "second sensing device" or as a "pair of second sensing devices". In one application, the fixed metallic elements 112 and 114 may be thin layers of copper film or any other electrically conductive material. The input member 102 includes a metallic member 118, which may be understood as a "first sensing device". The metallic member 118 preferably has a rectangular shape, and which is fixedly secured to the input member 102 so that it moves with the input member. The metallic member 118 may be a thin film of conductive material, such as copper. It will be understood that for certain applications while the rectangular shape may be preferred, other shapes such as a square shape, an oval shape, an elliptical shape, etc. could also be used. A rectangular shape, however, is expected to enhance the frequency change detected by the LC oscillator circuit 110 as the metallic member 118 moves between the positions shown in FIGS. 4 and 6, and thereby may enhance the sensing resolution of the system 100.

The metallic member 118 has been described as being secured to the input member 102 and the metallic elements 112 and 114 as being secured to the output member 104. It will also be appreciated, however, that this convention could be reversed. In this regard, the metallic member 118 may be secured to the output member 104 and the metallic elements 112 and 114 may be secured to the input member 102. The only requirement is that the metallic member 118 and the metallic elements 112 and 114 are disposed on different ones of the input and output members 102 and 104, and that the metallic member 118 will always be circumscribed by the coil 108, and will always be moving back and forth relative to the gap 116.

During operation, when the metallic member 118 is in the position shown in FIG. 4, the degree of metallic material exposed to the coil 108 will be at a minimum. This amount of material that the coil 108 "sees" is represented by the shaded portions 120, and is essentially just the metallic material represented by the fixed metallic elements 112 and 114 that overlays the coil 108. The frequency of the AC signal measured at the output of the LC oscillator circuit 110 will thus be at a predetermined frequency.

As the position of the input member 102 moves toward the output member 104, the tip portion of the rectangular shaped metallic member 118 will begin to cover the gap 116, as shown in FIG. 5. Thus, the coil 108 will "see" a greater degree of metallic material. Essentially, the metallic material of the rectangular shaped metallic member 118 will begin to fill the gap 116, which reduces the inductance of the coil 108. The inductance is reduced as more metal is presented to the coil 108. This is because of currents which are induced in the metal (components 112, 114 and 118), which then cause a magnetic field that opposes the field generated by coil 108. The degree of metallic material "seen" by the coil 108 is represented by shaded portions 120 in FIG. 5. This causes the frequency of the oscillating signal at the output of the LC oscillator circuit 110 to change. In this respect the system 100 operates similar to a conventional metal detector. The degree of change in the frequency of the AC input signal applied to the LC oscillator circuit 110, as measured at its output, can be correlated to the degree of axial movement of the input member 102 relative to the output member 104. This change in frequency indicates whether the gap 116 is effectively converging or lengthening.

In FIG. 6, the input member 102 is shown at one extreme position where the rectangular shaped metallic member 118 is completely bridging the fixed metallic elements 112 and 114. In this position the coil 108 "sees" the maximum amount of metallic material. This is represented by the shaded area 120. The change in frequency of the oscillating output signal from the LC oscillator circuit 110 will be at a maximum.

The system 100 is able to detect a change in the pedal gap distance by the change in relative position between the input member 102 and the metallic elements 112 and 114 on the output member 104. Importantly, this change may be detected in real time and may be used by the ECU of the vehicle to even more accurately estimate the pedal stroke travel, and thus to more accurately control the brake boost assist system, working in connection with the master cylinder, to determine the braking pressure being requested by the operator (via brake pedal movement) during a braking operation.

Figure 7:
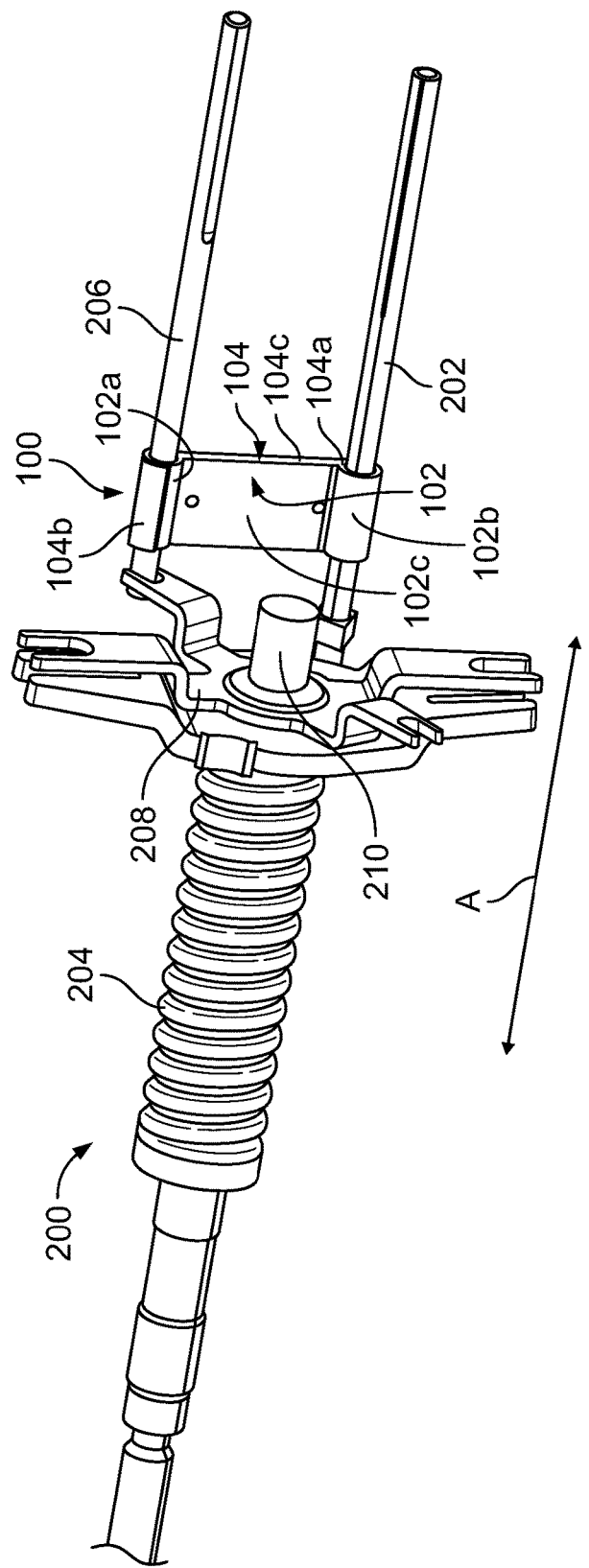
FIG. 7 shows one example of how the inductive sensing of FIG. 4 may be implemented into portions of a brake boost assist system.

With brief reference to FIG. 7, a subsystem 200 of the brake boost assist system of FIG. 1c is shown with the system 100 of FIG. 4 integrated into it. This represents just one of a plurality of different ways that the system 100 can be physically integrated into an otherwise well-known brake boost assist system. The input member 102 has one end which forms a sleeve portion 102a which is wrapped around and fixedly coupled to an elongated input rod 206, and another sleeve portion 102b at its opposite end. A sleeve portion 104b associated with the output member 104 is able to slide over the sleeve portion 102a of the input member 102 and also slide over the elongated input rod 206. Sleeve portion 104a, associated with the output member 104, is fixedly secured to the elongated output rod 202. Elongated output rod 202 is also operably associated with a lead screw portion 204 of the subsystem 200, and moves axially along arrow "A" when a threaded lead screw collar (not shown) positioned over the lead screw portion 204 is driven rotationally by an electric motor (not shown) of the brake boost assist system. The output member 104 thus moves axially in accordance with arrow A, and in accordance with movement of the elongated output rod 202 and the lead screw portion 204. And since the sleeve portion 102b of the input member 102 is uncoupled from sleeve portion 104a, the sleeve portion 102a is able to slide over the sleeve portion 104a and also over the elongated output rod 202, as the elongated input rod 206 and the elongated output rod 202 move relative to one another.

The elongated input rod 206 is in turn fixedly coupled to a bracket arm 208, which is in turn fixedly coupled to an input member 210 of the brake boost assist system. Therefore, as input member 210 moves the elongated input rod 206 axially back and forth along arrow A, the sleeve portion 102a, and thus the input member 102, moves in accordance with it. And since the output member 104 has its sleeve portion 104a fixedly secured to elongated output rod 202, the output member 104 and its associated sleeve portion 104b is free to slide over the sleeve portion 102a.

The input member 102 may have a planar body portion 102c and the output member 104 may have a similarly dimensioned planar body portion 104c. The planar body portions 102c and 104c thus overlap with a relatively small spacing between their facing surfaces. The metallic elements 112 and 114 illustrated in FIGS. 4-6 are positioned on the surface of the output member 104 planar body portion 104c portion which is substantially hidden from view in FIG. 7. Similarly, the metallic member 118 is positioned on the surface of the planar body portion 102c of the input member 102, which is the surface that faces the planar body portion 104c, and thus is not visible in FIG. 7. Since the overlap of the planar body portions 102c and 104c changes with movement of either the lead screw 204 (i.e., acting in connection with the elongated output rod 202 and sleeve portion 104a) or the input rod 210 (acting in connection with the sleeve portion 102a and elongated input rod 206), the position of the metallic member 118 will change relative to the positions of the metallic elements 112 and 114. Although not visible in FIG. 7, it will be appreciated that the coil 108 is mounted on an interior wall of the housing 106 of the brake boost assist system as described in connection with the discussion of FIGS. 4-6. FIG. 8 shows the various components described above integrated into the subsystem 200.

It will be understood that both of the systems 10 and 100 described herein can be configured to sense either the pedal gap defined in FIG. 1b or the pedal gap defined in FIG. 1c.

The various embodiments of the present disclosure presented herein can be implemented with a limited number of additional component parts, and without significantly increasing the complexity, cost or weight of a master cylinder system of the vehicle. The various embodiments are expected to significantly enhance the accuracy of the determination of the brake pedal stroke.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A brake boost assist system for use with a master cylinder of a motor vehicle braking system, the brake boost assist system comprising:
   an inductive sensing system including:
      a fixed sensing component fixedly disposed within the brake boost assist system;
      an axially movable input member operably associated with an input rod, the input rod in turn associated with a brake pedal of the vehicle, the input member movable in response to movement of the input rod and further being movable in proximity to the fixed sensing component, the axially movable input member including a first sensing device;

an output member generally axially aligned with the input member and adapted to be moved axially by the input member, the output member being operably associated with an output rod of the brake boost assist system and including a second sensing device;
the first and second sensing devices arranged to simulate an axial pedal gap separating faces of the input and output rods; and
wherein the inductive sensing system is responsive to movement of at least one of the input and output members relative to the other to provide an output signal indicative of a distance representing the axial pedal gap during brake pedal travel.

2. The system of claim 1, wherein the first sensing device includes an input member coil carried by the input member.

3. The system of claim 2, wherein the second sensing device includes an output member coil carried by the output member.

4. The system of claim 1, wherein the fixed sensing component includes first and second coils fixedly mounted within the brake boost assist system, the first coil circumscribing the second coil.

5. The system of claim 4, wherein the first and second coils are mounted on an interior wall portion of a housing of the brake boost assist system.

6. The system of claim 1, wherein the first sensing device and the second sensing device are further arranged on the input member and the output member, respectively, to overlap during a portion of axial movement of one of the input and output members relative to the other.

7. The system of claim 6, wherein the first sensing device includes an input member coil and the second sensing device includes an output member coil, and further wherein the fixed sensing component includes first and second fixedly mounted coils fixedly mounted within the brake boost assist system, the first fixedly mounted coil circumscribing the second fixedly mounted coil; and
wherein a degree of overlap of the input member coil and the output member coil controls a degree of magnetic flux coupling between the first and second fixedly mounted coils to provide the output signal which indicates the distance representing the axial pedal gap.

8. The system of claim 1, wherein one of the first and second sensing devices comprises a metallic member secured to one of the input member or the output member, and wherein the fixed sensing component comprises a coil fixedly secured to an inner wall of a housing of the brake boost assist system.

9. The system of claim 8, wherein a second one of the first and second sensing devices comprises a pair of metallic elements secured to the other one of the input member and the output member, and wherein the pair of metallic elements defines a fixed gap therebetween, and wherein the metallic member is longitudinally aligned with the pair of metallic elements in a manner to be able to at least partially overlay the gap between the pair of metallic elements as the input member is moved relative to the output member.

10. The system of claim 9, further comprising an inductive capacitive (LC) circuit for applying an alternating current signal to the coil.

11. The system of claim 10, wherein a change in a position of the metallic member, relative to the pair of metallic elements causes a change in a frequency of an output signal from the LC circuit representative of a change in the distance representing the axial pedal gap.

12. The system of claim 11, wherein the metallic member overlaps a greater degree or a lesser degree of the gap during movement of the input member relative to the output member, which affects the frequency of the output signal from the LC circuit.

13. The system of claim 8, wherein the metallic member comprises a rectangular shaped metallic member.

14. A brake boost assist system for use with a master cylinder of a motor vehicle braking system, the brake boost assist system comprising:
an inductive sensing system for detecting an axial pedal gap between faces of an input rod and an output rod of the brake boost assist system, the inductive sensing system including:
an AC input signal source for generating an AC input signal;
a first fixedly mounted coil disposed within the brake boost assist system;
a second fixedly mounted coil disposed within the brake boost assist system and circumscribed by the first fixedly mounted coil, one of the first and second fixedly mounted coils receiving the AC input signal;
an axially movable input member operably associated with the input rod, which is in turn associated with a brake pedal of the vehicle, and wherein the input member is movable in response to movement of the input rod and further being movable in proximity to the first and second fixedly mounted coils, the axially movable input member including an input member coil;
an output member generally axially aligned with the input member and adapted to be moved axially by the input member, the output member being operably associated with the output rod of the brake boost assist system and including an input member coil;
the input and output member coils further being arranged to at least partially overlap one another during movement of the input and output rods;
a degree of overlap of the input and output member coils during movement of at least one of the input and output rods influencing an inductive coupling between the first fixedly mounted coil and the second fixedly mounted coil; and
the one of the first and second fixedly mounted coils that is not receiving the AC input signal providing an output signal representing the axial pedal gap during brake pedal travel.

15. The system of claim 14, wherein the first and second fixedly mounted coils are mounted to an inner wall of a housing of the brake boost assist system.

16. A brake boost assist system for use with a master cylinder of a motor vehicle braking system, the brake boost assist system comprising:
an inductive sensing system for detecting an axial pedal gap between faces of an input rod and an output rod of the brake boost assist system, the inductive sensing system including:
an LC oscillator circuit;
a coil fixedly disposed within the brake boost assist system which receives an AC signal from the LC oscillator circuit;
an axially movable input member operably associated with the input rod, which is in turn associated with a brake pedal of the vehicle, and wherein the input member is movable in response to movement of the input rod and further being movable in proximity to the coil;
an output member generally axially aligned with the input member and adapted to be moved axially by the input member, the output member being operably associated with an output rod of the brake boost assist system;

one of the input and output members including a metallic sensing member and the other including spaced apart, fixed metallic sensing elements;

the metallic sensing member and the metallic sensing elements further being arranged to simulate the axial pedal gap separating the faces of the input and output rods; and the inductive sensing system being responsive to movement of at least one of the input member and the output member relative to the other, which changes a degree of overlap of the metallic sensing member relative to the metallic sensing elements, which causes a change in frequency of an output signal from the LC oscillator circuit, the output signal being indicative of a distance representing the axial pedal gap during brake pedal travel.

17. The system of claim 16, wherein the metallic sensing elements comprise a pair of spaced apart, fixed metallic elements arranged along a longitudinal axis of movement of the metallic sensing member, the spaced apart, fixed metallic sensing elements defining a gap therebetween.

18. The system of claim 17, wherein the metallic sensing member is arranged to at least partially overlap the gap between the pair of spaced apart, fixed metallic sensing elements during movement of one of the input or output members.

19. A method for sensing a pedal gap within a brake boost assist system associated with a master cylinder of a braking system of a motor vehicle, the method comprising:

arranging a fixedly mounted sensing component within the brake boost assist system;

coupling an axially movable input member to an input rod of the brake boost assist system, the input rod in turn being associated with a brake pedal of the vehicle, and wherein the input member is movable in response to movement of the input rod and further being movable in proximity to the fixedly mounted sensing component, the axially movable input member including a first sensing device;

coupling an output member to an output rod of the brake boost assist system, the output member further being generally axially aligned with the input member and moveable axially by the input member, and carrying a second sensing device;

forming an inductive circuit with the first and second sensing devices and the fixedly mounted sensing component; and generating a signal with the inductive circuit indicative of a distance representing an axial pedal gap separating faces of the input member and the output member during brake pedal travel in response to movement of at least one of the first sensing device, the second sensing device and the fixedly mounted sensing component.

20. The method of claim 19, wherein the arranging a fixedly mounted sensing component comprises arranging a coil fixedly within a housing of the brake boost assist system.

* * * * *